(12) United States Patent
Jahn et al.

(10) Patent No.: US 7,007,548 B2
(45) Date of Patent: Mar. 7, 2006

(54) ROAD TEST SIMULATOR WITH PLURAL ROLLERS

(75) Inventors: Lars Jahn, Nuremberg (DE); Otto Zinth, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/618,768

(22) Filed: Jul. 15, 2003

(65) Prior Publication Data

US 2004/0050150 A1 Mar. 18, 2004

Related U.S. Application Data

(63) Continuation of application No. PCT/DE02/00020, filed on Jan. 7, 2002.

(30) Foreign Application Priority Data

Jan. 15, 2001 (DE) ................. 101 01 579

(51) Int. Cl.
*G01M 17/02* (2006.01)
(52) U.S. Cl. .......................... 73/146; 73/117
(58) Field of Classification Search ................. 73/117, 73/146, 146.2, 146.3, 146.4, 146.5, 146.8
See application file for complete search history.

(56) References Cited

U.S. PATENT DOCUMENTS 2,766,618 A 10/1956 Stiehler et al.
3,520,180 A * 7/1970 Ris et al. ...................... 73/670
4,385,518 A * 5/1983 Rickett ......................... 73/117
4,455,866 A 6/1984 Barrigar
4,635,472 A * 1/1987 Scourtes ....................... 73/117
4,825,690 A * 5/1989 Mears .......................... 73/117
5,000,038 A * 3/1991 Katt ............................. 73/117
5,036,700 A * 8/1991 Knestel ........................ 73/117
5,063,700 A * 11/1991 Kiefer et al. ................ 43/17.6
5,101,660 A * 4/1992 La Belle ....................... 73/117
5,323,644 A * 6/1994 Schaefer ...................... 73/117
5,375,461 A * 12/1994 Suzuki ......................... 73/117
5,392,640 A 2/1995 Fukuda et al.
5,542,290 A * 8/1996 Suzuki ......................... 73/117
5,655,262 A * 8/1997 Sterin et al. ................ 19/200
6,457,352 B1 * 10/2002 Knestel ........................ 73/117

FOREIGN PATENT DOCUMENTS

| DE | 66 728 A | 5/1969 |
|----|----|----|
| DE | 37 44 631 A1 | 7/1989 |
| DE | 39 22 570 A1 | 4/1990 |
| DE | 195 05 533 A1 | 8/1996 |
| DE | 299 18 490 U1 | 1/2001 |
| EP | 0 246 345 A1 | 11/1987 |
| EP | 0 507 631 A1 | 10/1992 |

* cited by examiner

*Primary Examiner*—Edward Lefkowitz
*Assistant Examiner*—Andre Allen

(74) *Attorney, Agent, or Firm*—Sughrue Mion, PLLC

(57) ABSTRACT

A road test simulator having four rollers, each provided with an uneven surface coating, and four asynchronous motors, each of which drives one of the rollers.

20 Claims, 3 Drawing Sheets

FIG 2
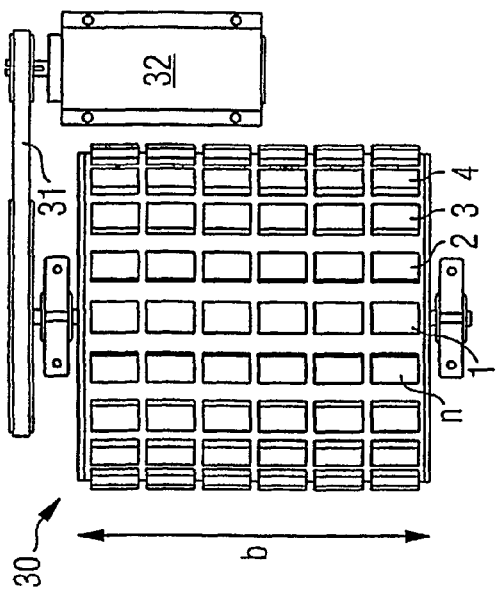
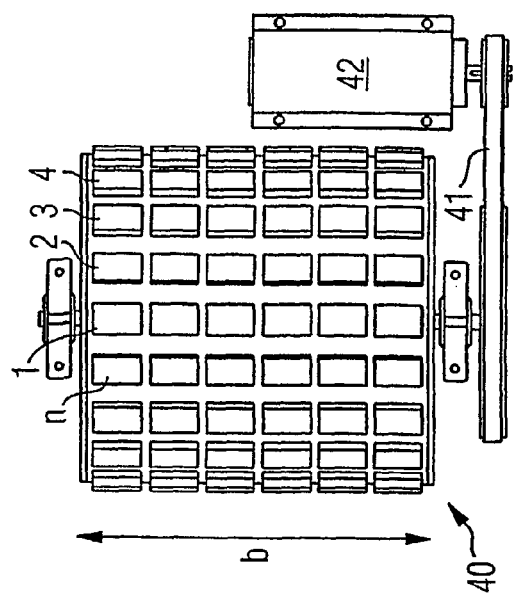
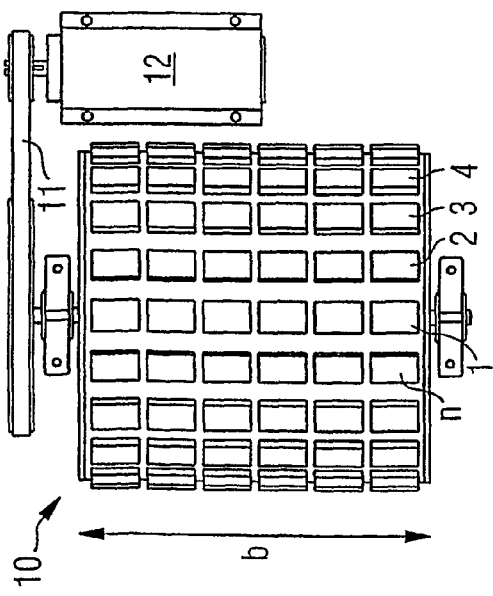
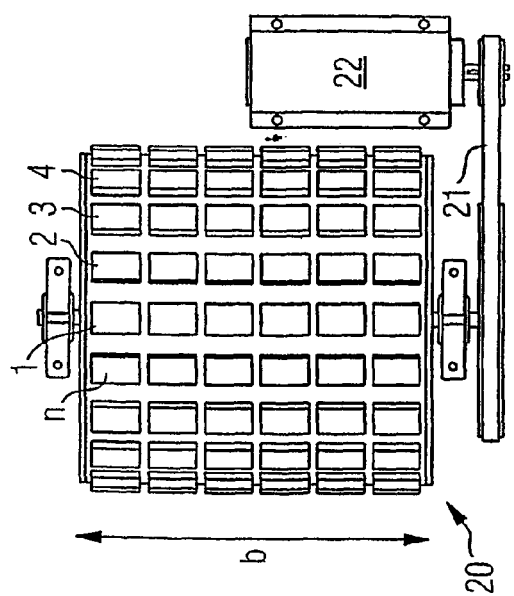

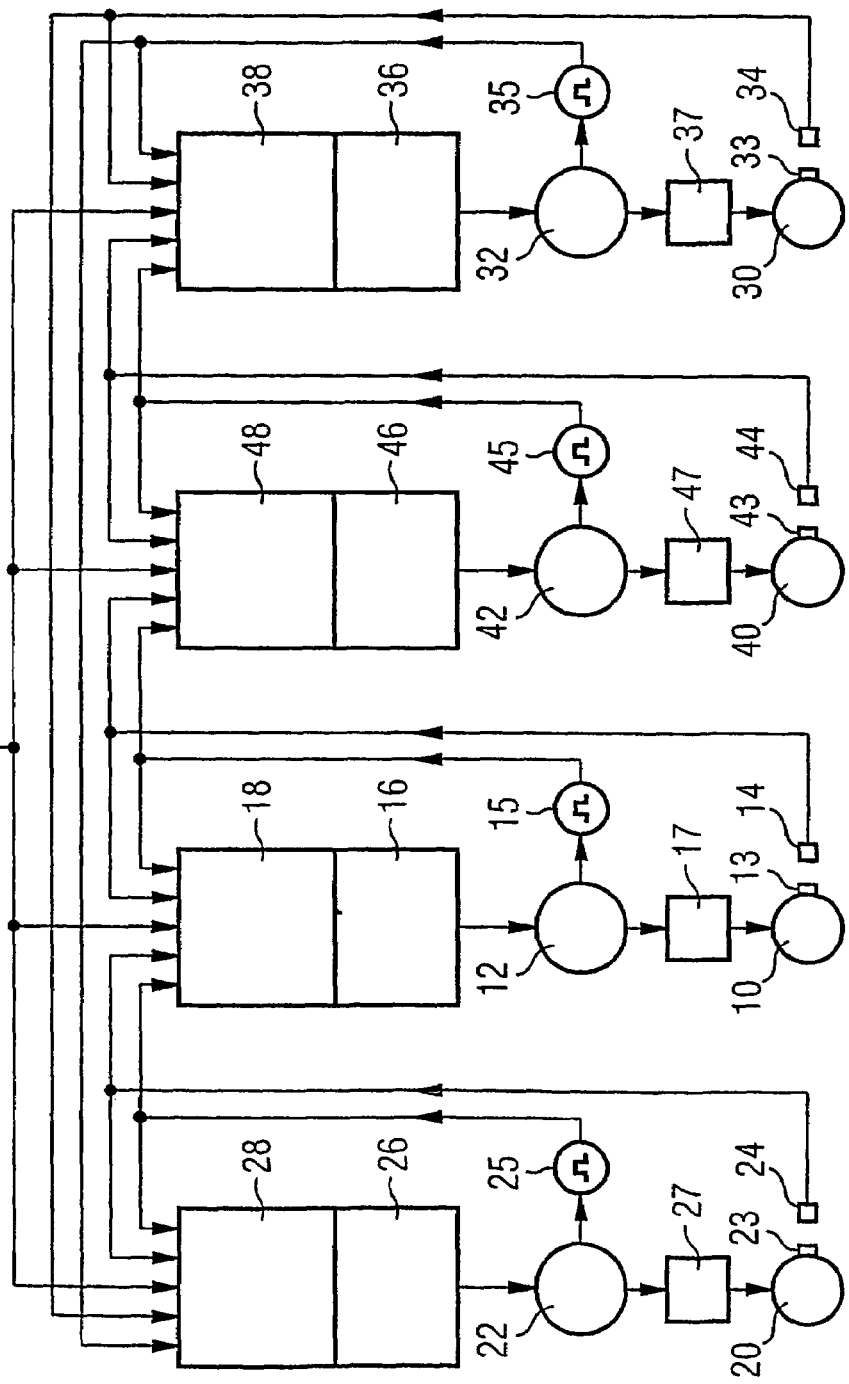

ROAD TEST SIMULATOR WITH PLURAL ROLLERS

This is a Continuation of International Application PCT/DE02/00020, with an international filing date of Jan. 7, 2002, which was published under PCT Article 21(2) in German, and the disclosure of which is incorporated into this application by reference.

FIELD OF AND BACKGROUND OF THE INVENTION

The invention relates to a road test simulator.

In order to inspect a vehicle after its final assembly, various tests are ordinarily conducted. These tests are often carried out as actual road tests, which renders the testing costly.

So as to abbreviate or to completely replace such costly road tests, it is known in the art to provide a road test simulator, which can be used to simulate the irregularities of a road surface. Most prior-art simulators, however, have rollers with a non-adjustable profile. As a result they are inflexible and thus suitable only for limited testing of a vehicle.

A road test simulator with profiled rollers is known from German reference DE 299 18 490.0. Each of these rollers is provided with a plurality of profile-imparting blocks along its outer circumference. These blocks can be adjusted in the radial direction of the roller to change the profile of the roller. Each roller ranges in width from a single to a double width of the vehicle tire. The road test simulator is additionally provided with a computer unit to implement a test program. With the aid of this test program, the computer unit can be programmed, for example, to simulate different road surfaces automatically by adjusting the blocks of the rollers.

Published European Application EP 0 507 631 A discloses a method and an apparatus for testing two or four wheel drive vehicles under simulated road conditions. One embodiment, depicted in FIG. 5 of that reference, relates to a testing apparatus that has a separate roller for each wheel of a test vehicle. Each roller is associated with a separate power supplying and/or absorbing unit that is preferably equipped with a DC motor.

Further, German Laid Open Publication DE 37 44 631 A discloses a method and an apparatus for conducting vehicle life tests. FIG. 4 of this publication also shows an arrangement with a separate drum for each vehicle wheel. The bearing units for the drums are displaceable in longitudinal and transverse vehicle direction in order to adjust them to the wheelbase and the wheel gauge of the test vehicles. As in brake test stands, the inert mass of the drums is adapted to the mass of the vehicle, especially to simulate acceleration and braking on the test stand.

OBJECTS OF THE INVENTION

One object of the invention is to provide an improved road test simulator.

SUMMARY OF THE INVENTION

According to one formulation of the invention, this and other objects are attained by a road test simulator having four rollers, each of which has an irregular surface cover, and four asynchronous motors, each of which drives a respective one of the rollers. Advantageous embodiments and further developments of the invention are explained in greater detail below.

Advantages of the invention include that the road test simulator, through the use of a four-motor concept, can be operated in a plurality of different operating modes. For example, the claimed simulator can be used to test front, rear or all wheel drive vehicles. Furthermore, a simulator according to the invention can be used to simulate uphill or downhill driving. A simulator according to the invention can provide additional operating modes as well, such as an operating mode in which asynchronous motors drive the rollers and the vehicle is operated in neutral, and an operating mode in which the vehicle drives the rollers.

The width of the rollers is preferably selected such that even light vehicle steering motions cause the vehicle to float on the rollers from left to right or vice versa. The surface quality of the rollers can vary over the width of the rollers. This makes it possible to simulate a test drive over different road surfaces in a single test cycle.

This vibration test provides a number of advantages. For example, the vehicle vibrations produced during the test can cause bad or loose electrical plug-in connections in the vehicle to become detached. These detached plug-in connections are detected in a subsequent ECOS (Electric Checkout System) test, and the faults can then be corrected.

Furthermore, the vibrations allow the chassis parts, which have not previously been subjected to major loads, to settle. This leads to a better chassis adjustment, which can be carried out, for example, directly following a combined ESP/vibration simulator.

Furthermore, rattling and vibration noise can be better localized and reproduced than during an outdoor vibration test drive. Weather factors are largely excluded.

In addition, according to the invention, the user can adjust the offset angle between the rollers in any manner to simulate different road surfaces.

BRIEF DESCRIPTION OF THE DRAWINGS

Further advantageous features of the invention will now be described by way of example with reference to the figures in which:

FIG. 2 is a schematic top view of the road test simulator according to FIG. 1 and FIG. 3 is a block diagram illustrating the interaction of individual components of a road test simulator according to an embodiment of the invention.

DETAILED DESCRIPTION OF THE PREFERRED EMBODIMENTS

Figure 1:
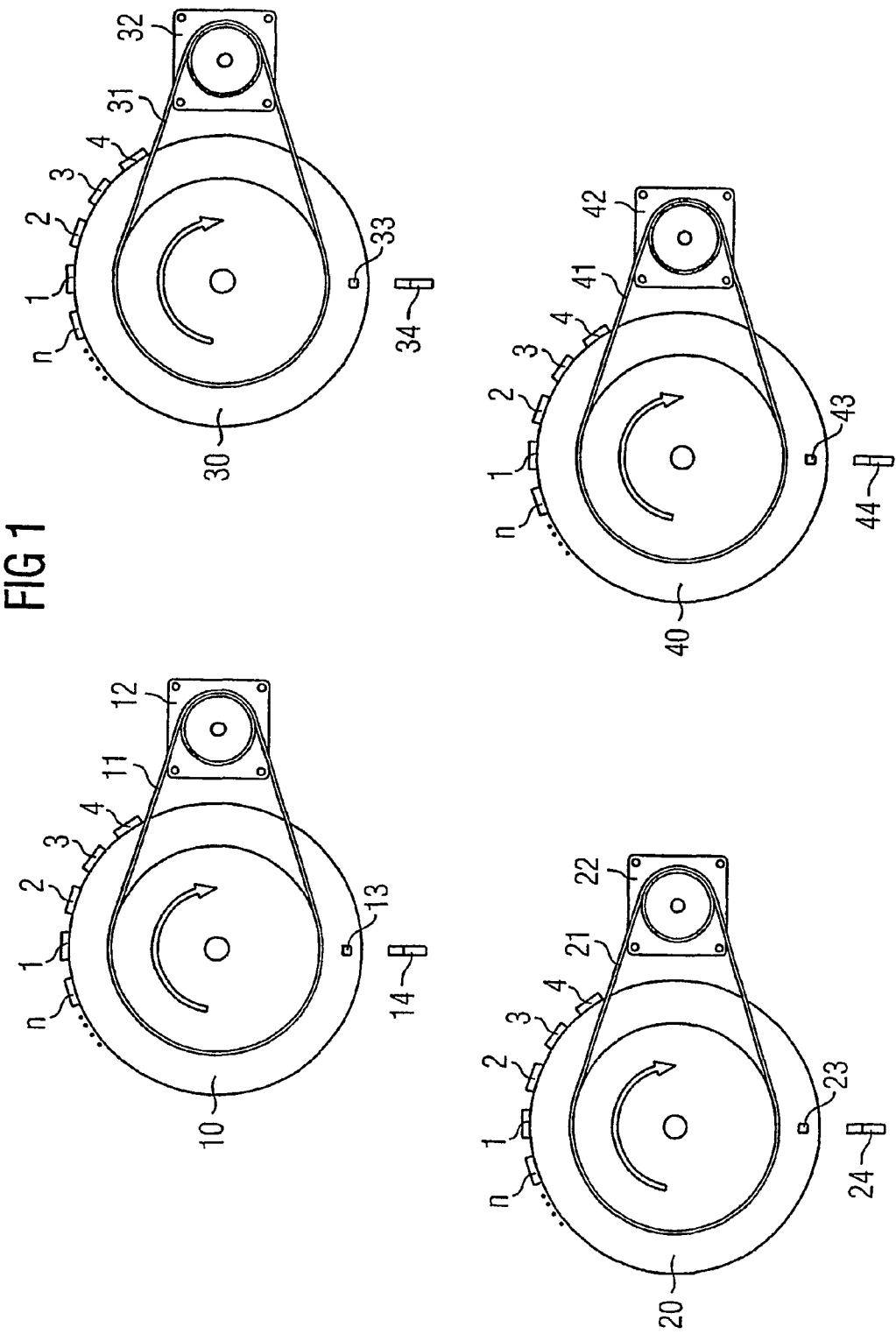
FIG. 1 is a schematic side view showing basic components of a road test simulator.

The road test simulator depicted in the figures is a vibration simulator. It has four rollers, each of which is provided with an irregular surface cover. To drive the rollers, inverter-supplied asynchronous motors connected respectively with the rollers via toothed belts are provided. An electronic control unit controls the speed and the synchronous operation of the rollers. The vibrations of the vehicle positioned on the rollers are produced by the rotation of the vehicle wheels on the rollers. The rollers are preferably hollow steel rollers with an irregular surface coating made of metal plates or stone and applied to the corresponding roller. All four rollers are equipped with the same surface pattern.

In a first operating mode, a test driver drives the vehicle on the rollers. In a second operating mode, the wheels of the vehicle, without brakes applied and with clutch disengaged, are driven by the rollers. In both operating modes, the control unit ensures angular synchronism between the rollers. Furthermore, the relative position of the rollers can be mutually adjusted to simulate different road surfaces.

FIG. 1 is a schematic side view showing the primary components of a road test simulator according to the invention. The simulator has four rollers 10, 20, 30, 40. Each of these rollers is hollow on the inside and on the outside is provided with rows of pavement 1, 2, 3, 4, . . . , n. The rows of pavement each extend in axial direction of the roller. The width of each of the rollers is preferably greater than twice the width of a vehicle tire. The width of a roller is preferably in the range between 90 cm and 110 cm.

Each row of pavement has a plurality of paving stones arranged side by side and preferably differing in height. The radially adjacent paving stones of adjacent pavement rows also have different heights. The paving stones serve to simulate a cobble stone pavement.

Each of the rollers 10, 20, 30, 40 is connected with an asynchronous motor 12, 22, 32, 42 which drives the corresponding roller via a toothed belt 11, 21, 31, 41.

Furthermore, each of the rollers 10, 20, 30, 40 is provided with a sensor actuator 13, 23, 33, 43, which passes a sensor 14, 24, 34, 44 once with each rotation of the roller, so that the sensor generates a reference pulse, e.g., a synchronization pulse or a zero position signal.

FIG. 2 is a top view of the road test simulator shown in FIG. 1. The reference numerals in FIG. 2 are the same as those used in FIG. 1. FIG. 2 clearly shows the cobblestone-type structure of the surface coating of the rollers 10, 20, 30, 40. To drive the rollers, the asynchronous motors 12, 22, 32, 42 are provided, which are connected with the rollers, or with a shaft penetrating the corresponding roller, via toothed belts 11, 21, 31, 41. The letter "b" indicates the width of the roller.

FIG. 3 is a block diagram to illustrate the interaction of the individual components of a road test simulator according to the described embodiment of the invention.

The road test simulator depicted has four rollers 10, 20, 30, 40. During the testing operation, the left front wheel of the motor vehicle is positioned on the roller 20. The roller 20 is driven by an asynchronous motor 22 with interposed gearing 27. This asynchronous motor is controlled by an inverter 26, which in turn is controlled by a control unit 28. The asynchronous motor 22 is equipped with a tachometer or a pulse generator 25, which emits a plurality of tacho pulses, e.g. 1024, with each revolution of the motor. The output signal of the pulse generator 25 is supplied to a control unit 28. The roller 20 has a sensor actuating vane 23. When this actuating vane passes a sensor 24 during one rotation of the roller, the sensor 24 supplies a synchronization pulse, which is also supplied to the control unit 28.

The control unit 28 further receives a synchronization pulse derived from a sensor 34 and the tacho pulses generated by a tachometer or pulse generator 35.

During the testing operation, the right front wheel of the vehicle is positioned on the roller 10. The roller 10 is driven by an asynchronous motor 12 with interposed gearing 17. This asynchronous motor is controlled by an inverter 16, which in turn is controlled by a control unit 18. The asynchronous motor 12 is equipped with a tachometer or pulse generator 15, which emits a plurality of tacho pulses, e.g. 1024, with each revolution of the motor. The output signal of the pulse generator 15 is supplied to the control unit 18. The roller 10 has a sensor actuating vane 13. When this actuating vane passes a sensor 14 during one rotation of the roller, the sensor supplies a synchronization pulse, which is also supplied to the control unit 18. The control unit 18 further receives the synchronization pulse derived from the sensor 24 and the tacho pulses generated by the tachometer or the pulse generator 25.

During the testing operation, the right rear wheel of the motor vehicle is positioned on the roller 40. The roller 40 is driven by an asynchronous motor 42 with interposed gearing 47. This asynchronous motor is controlled by an inverter 46, which in turn is controlled by a control unit 48. The asynchronous motor 42 is equipped with a tachometer or pulse generator 45, which emits a plurality of tacho pulses, e.g. 1024, with each revolution of the motor. The output signal of the pulse generator 45 is supplied to the control unit 48. The roller 40 has a sensor actuating vane 43. When this actuating vane passes a sensor 44 during one rotation of the roller, the sensor supplies a synchronization pulse, which is also supplied to the control unit 48. The control unit 48 further receives the synchronization pulse derived from the sensor 14 and the tacho pulses generated by the tachometer or pulse generator 15.

During the testing operation, the left rear wheel of the motor vehicle is positioned on the roller 30. The roller 30 is driven by an asynchronous motor 32 with interposed gearing 37. This asynchronous motor is controlled by an inverter 36, which in turn is controlled by a control unit 38. The asynchronous motor 32 is equipped with a tachometer or pulse generator 35, which emits a plurality of tacho pulses, e.g. 1024, with each revolution of the motor. The output signal of the pulse generator 35 is supplied to the control unit 38. The roller 30 has a sensor actuating vane 33. When this actuating vane passes a sensor 34 during one rotation of the roller, the sensor supplies a synchronization pulse, which is also supplied to the control unit 38. The control unit 38 also receives the synchronization pulse derived from the sensor 44 and the tacho pulses generated by the tachometer or pulse generator 45.

The road test simulator depicted in FIG. 3 makes it possible to test front, rear and all wheel drive vehicles. During operation of the simulator, one of the rollers is assigned a master function while the other rollers are slaves. For vehicles with front wheel drive, for example, the left front roller 20 is assigned a master function. For vehicles with rear-wheel drive, for example, the right rear roller 40 is assigned a master function. For vehicles with all-wheel drive, for example, the left front roller 20 or the left rear roller 30 can be assigned a master function.

This will now be described, by way of example, for vehicles with front-wheel drive.

A higher-level control 50 specifies a setpoint speed to the control unit 28. The control unit 28 controls the inverter 26 as a function of the setpoint speed in such a way that the inverter, in turn, controls the asynchronous motor 22 as a function of the setpoint speed. The asynchronous motor in turn drives the roller 20 via the gearing 27, so that the roller rotates at a speed that is a function of the setpoint speed. During this rotation of the roller 20, the sensor actuating vane 23 passes the sensor 24 once with each rotation of the roller, and the sensor 24 emits a synchronization pulse. This synchronization pulse is supplied to the control unit 28 and to the control unit 18 associated with the roller 10. Furthermore, the tacho pulses derived from the motor 22 by means of the pulse generator 25 are also supplied to the control unit 28 and to the control unit 18 associated with the roller 10.

The control unit 28 further receives the pulses generated by the pulse generator 35 associated with the rear left roller 30 and by the sensor 34, also associated with the rear left roller 30.

The control unit 28 has a position/angle controller and a speed governor. The position/angle controller contributes to the fine-tuning of the speed by comparing the pulses derived from the asynchronous motor 22 and the roller 20 with the pulses derived from the asynchronous motor 32 and the roller 30 and by providing a fine-tuning signal as a function of the determined difference to the speed governor. In the speed governor, this signal is superimposed on the setpoint speed signal provided by the higher-level control. The output signal of the speed governor is used to control the asynchronous motor 22 driving the left front roller 20, which acts as the master.

The control unit 18, which also has a position/angle controller and a speed governor, likewise receives the setpoint speed from the higher-level control 50. This setpoint speed serves as a rough setpoint value. The control unit 18 of the front right roller 10 further receives the tachometer and synchronization pulses derived from the pulse generator 25 and the sensor 24 of the master as setpoint values. In the position/angle controller of the control unit 18 these setpoint values are compared with the tachometer and synchronization pulses generated by the pulse generator 15 and the sensor 14, which are actual values. The position/angle controller provides a fine-tuning signal as a function of the determined difference to the speed governor. In the speed governor, this signal is superimposed on the rough setpoint value. The output signal of the speed governor is used to control the asynchronous motor 12 driving the right front roller 10, which serves as a slave.

The control unit 48, which also has a position/angle controller and a speed governor, likewise receives the setpoint speed from the higher-level control 50 as a rough setpoint value. The control unit 48 of the rear right roller 40 further receives the tachometer and synchronization pulses derived from the pulse generator 15 and the sensor 14 as setpoint values. In the position/angle controller of the control unit 48 these setpoint values are compared with the tachometer and synchronization pulses generated by the pulse generator 45 and the sensor 44, which are actual values. The position/angle controller provides a fine-tuning signal as a function of the determined difference to the speed governor. In the speed governor, this signal is superimposed on the rough setpoint value. The output signal of the speed governor is used to control the asynchronous motor 42 driving the right rear roller 40.

The control unit 38, which also has a position/angle controller and a speed governor, likewise receives the setpoint speed from the higher-level control 50 as a rough setpoint value. The control unit 38 of the rear left roller 30 further receives the tachometer and synchronization pulses derived from the pulse generator 45 and the sensor 44 as setpoint values. In the position/angle controller of the control unit 38 these setpoint values are compared with the tachometer and synchronization pulses generated by the pulse generator 35 and the sensor 34, which are actual values. The position/angle controller provides a fine-tuning signal as a function of the determined difference to the speed governor. In the speed governor, this signal is superimposed on the rough setpoint value. The output signal of the speed governor is used to control the asynchronous motor 32, which drives the left rear roller 30.

In this manner, the speed or the RPM of each roller is controlled. In addition, an angular synchronism of the rollers is achieved. This angular synchronism control can also be used in conventional simulators equipped with rollers.

In the concept described above, the slave drives are matched in relation to the master drive to obtain the angular synchronism. This matching can be effected in terms of a parameterized angle offset between the drives. Since—as explained above—all four rollers are equipped with the same pattern, different road surfaces can be simulated in a single test cycle by changing the offset angle, possibly multiple times.

The above concept can be used in two operating modes. In the first of these operating modes, the vehicle positioned on the rollers can be operated without brakes applied and with clutch disengaged, so that the vehicle wheels are rotated by the driven rollers. In the second operating mode, the vehicle wheels positioned on the rollers are rotated by actuating the gas pedal of the vehicle.

Advantageously, uphill and downhill driving can also be simulated. For this purpose, a positive or negative torque is defined for the drive used as the master.

The rollers do not require any additional brakes. Any braking of the rollers is effected by a corresponding control of the asynchronous motors.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Road test simulator comprising:
    four rollers, each of which has an irregular surface cover, and
    four asynchronous motors, each of which drives a respective one of the rollers;
    wherein the rollers each comprise a plurality of coating rows extending in axial direction along respective outer circumferences of the rollers.

2. Road test simulator as claimed in claim 1, wherein the rollers have respective widths greater than twice a tire width of the tires of a vehicle tested by the road test simulator.

3. Road test simulator as claimed in claim 1, wherein the rollers have respective widths within a range of 90 cm to 110 cm.

4. Road test simulator as claimed in claim 1, wherein the coating rows comprise pavement rows made of stone or metal.

5. Road test simulator as claimed in claim 4, wherein each pavement row comprises a plurality of paving stones arranged side by side.

6. Road test simulator as claimed in claim 5, wherein the paving stones arranged side by side differ in relative height.

7. Road test simulator as claimed in claim 4, wherein paving stones belonging to adjacent pavement rows differ in relative height.

8. Road test simulator as claimed in claim 5, wherein the pavement rows simulate a cobble stone road surface.

9. Road test simulator as claimed in claim 1, further comprising inverters respectively controlling the asynchronous motors.

10. Road test simulator as claimed in claim 1, further comprising control units, each of which controls speed and angular synchronism of a respective one of the rollers.

11. Road test simulator as claimed in claim 10, wherein each of the rollers comprises a reference position sensor.

12. Road test simulator as claimed in claim 10, wherein the control units are configured to control the asynchronous motors to operate with a selectable angle offset between the rollers.

13. Road test simulator as claimed in claim 10, wherein the control units provide one of the rollers a master function and remaining ones of the rollers a slave function.

14. Road test simulator as claimed in claim 10, wherein the control units provide two operating modes, wherein:
   in the first operating mode, the rollers are driven by the asynchronous motors and the motor vehicle is operated in neutral, and
   in the second operating mode, the rollers are driven by the motor vehicle.

15. Road test simulator as claimed in claim 13, wherein the control unit providing the master function produces a non-zero torque to simulate uphill or downhill driving.

16. Road test simulator comprising:
   four rollers, each of which has an irregular surface cover;
   four asynchronous motors, each of which drives a respective one of the rollers; and
   control units, each of which controls speed and angular synchronism of a respective one of the rollers,
   wherein each of the rollers comprises a reference position sensor.

17. Road test simulator comprising:
   four rollers, each of which has an irregular surface cover;
   four asynchronous motors, each of which drives a respective one of the rollers; and
   control units, each of which controls speed and angular synchronism of a respective one of the rollers,
   wherein the control units are configured to control the asynchronous motors to operate with a selectable angle offset between the rollers.

18. Road test simulator comprising:
   four rollers, each of which has an irregular surface cover;
   four asynchronous motors, each of which drives a respective one of the rollers; and
   control units, each of which controls speed and angular synchronism of a respective one of the rollers,
   wherein the control units provide one of the rollers a master function and remaining ones of the rollers a slave function.

19. Road test simulator as claimed in claim 18, wherein the control unit providing the master function produces a non-zero torque to simulate uphill or downhill driving.

20. Road test simulator comprising:
   four rollers, each of which has an irregular surface cover;
   four asynchronous motors, each of which drives a respective one of the rollers; and
   control units, each of which controls speed and angular synchronism of a respective one of the rollers,
   wherein the control units provide two operating modes, wherein:
      in the first operating mode, the rollers are driven by the asynchronous motors and the motor vehicle is operated in neutral, and
   in the second operating mode, the rollers are driven by the motor vehicle.

* * * * *